United States Patent [19]

Otsuka et al.

[11] 4,256,322
[45] Mar. 17, 1981

[54] COMBINED CARRYING AND LOCKING DEVICE FOR A CYCLE

[75] Inventors: Norimoto Otsuka, Tokyo; Osanori Godo, Ooi, both of Japan

[73] Assignee: Honda Giken Kogyo Kabushiki Kaisha, Tokyo, Japan

[21] Appl. No.: 46,787

[22] Filed: Jun. 8, 1979

[30] Foreign Application Priority Data

Jun. 23, 1978 [JP] Japan .............................. 53-86250[U]

[51] Int. Cl.³ .......................... B62J 7/02; E05B 71/00
[52] U.S. Cl. .................................. 280/289 L; 70/233; 224/31; 224/35; 280/289 A
[58] Field of Search ............... 280/289 L, 289 A, 297; 70/233, 234, 235; 224/31, 35

[56] References Cited

U.S. PATENT DOCUMENTS 2,892,577  6/1959  Chew ...................................... 224/31
4,155,231  5/1979  Zane ....................................... 70/233

FOREIGN PATENT DOCUMENTS 429746  2/1948  Italy ............................................ 224/31
1037325  7/1966  United Kingdom ................ 280/289 A Primary Examiner—John P Silverstrim
Attorney, Agent, or Firm—Haseltine and Lake

[57] ABSTRACT

A combined autobicycle lock and carrier apparatus having a frame formed in the shape of a U with two legs, the width of which is at least larger than the width of the tire of the autobicycle. A locking bar is disposed between two free ends of the locking member carrier body. A locking device disposed within said bar integrally fastens the bar to the locking member-carrier body. Front and rear support members are attached to the autobicycle frame for affixing the locking member-carrier body in proper position on the frame.

3 Claims, 4 Drawing Figures

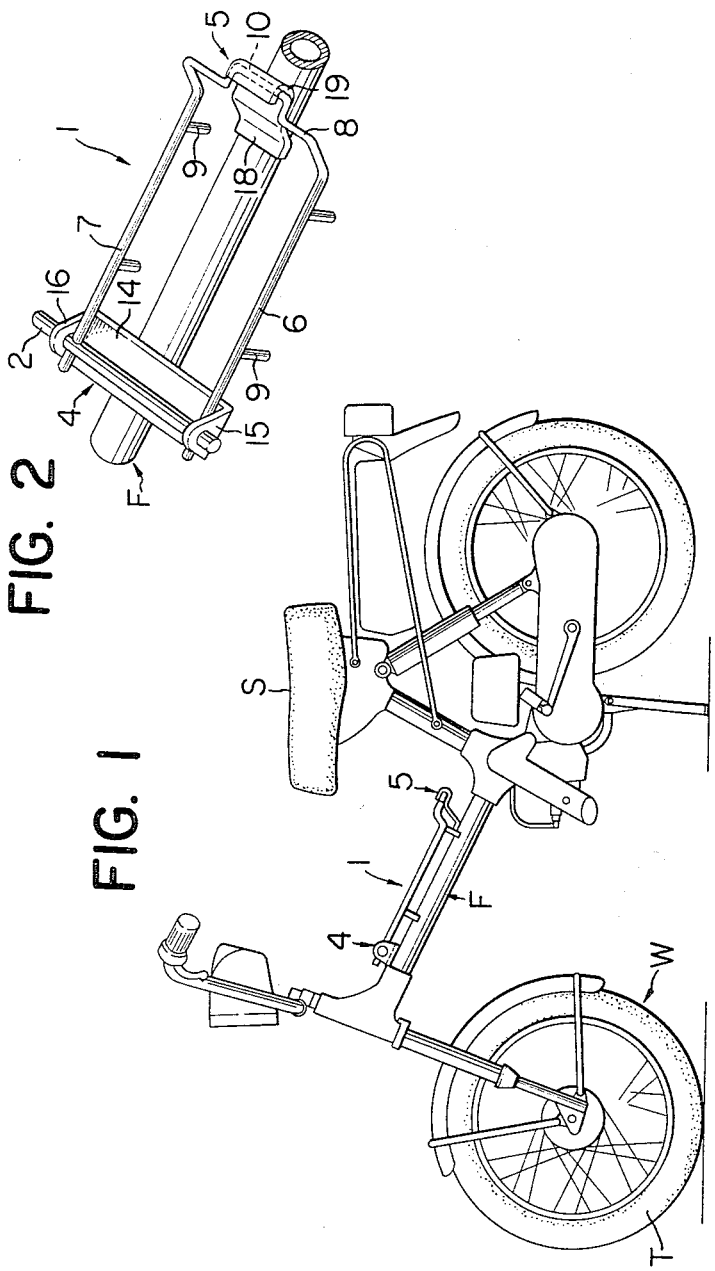

COMBINED CARRYING AND LOCKING DEVICE FOR A CYCLE

BACKGROUND OF THE INVENTION

1. Field of the Invention

The present invention relates to a combined locking and carrying device for an autobicycle which can lock the autobicycle to a fixed post or pole on the ground for preventing the autobicycle from being stolen. In addition, the device can serve as a carrier for placing baggage thereon.

2. Description of the Prior Art

Relatively light-weight cycles, have recently been popularized. In these light cycles, a conventional handle lock device is provided but is typically so light in weight and simply mounted so as to be readily stolen.

SUMMARY OF THE INVENTION

It is the main object of the invention to overcome the prior art.

It is therefore another object of the present invention to provide a combined theft-proof and carrier device in an cycle, which is simple in construction.

Still another object of the invention is to provide a carrier mounted on a body frame of the cycle for supporting thereon a baggage or the like and adapted, when parked, to be simply locked to a fixed post or pole on the ground. The principal feature of the invention is directed to a combined carrying and locking device for a cycle having a frame, said device comprising: a bracket means fixed to said frame, a substantially u-shaped carrier body including a pair of parallel spaced legs and a base portion interconnecting said legs; a bar removably receiving said legs, said bar being removably mounted on said bracket means; a supporting member fixed to said frame for removably engaging said base portion when said bar is mounted on said bracket means whereby said carrier body may carry an article to be transported by said cycle; and means disposed within said bar for selectively locking said legs to said bar whereby said carrier body and bar may be removed from said bracket means and used to encircle an element of said cycle in a locked condition.

BRIEF DESCRIPTION OF THE DRAWINGS

FIG. 1 is a side view of a cycle equipped with a device in accordance with the present invention;

FIG. 2 is a perspective view of the device of the invention, being used as a carrier;

DESCRIPTION OF THE PREFERRED EMBODIMENTS

Figure 3:
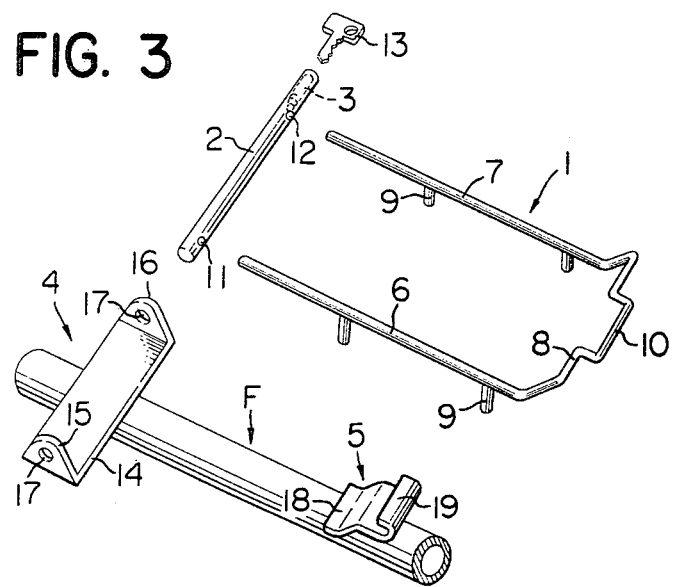
FIG. 3 is an exploded perspective view of the device.

In the following, one embodiment of the present invention will be described with reference to the drawings. The device of the present invention comprises a combined locking member and carrier body 1, a locking bar 2 removably inserted into the body 1, a well-known locking device 3 for integrally fixedly fastening the combined locking member and carrier body 1 and locking bar 2. Front and rear support members 4, 5 detachably support both the combined locking member and carrier body 1 and locking bar 2 on a body frame F of the cycle.

The combined locking member and carrier body 1 is composed of two right and left legs 6, 7 in the form of a bar bent into a substantially U-shape and extending in parallelism with each other. A base portion 8 is adapted to connect these legs, in which spacing between the right and left legs 6, 7 is at least larger in width than the width of a tire T of a wheel W of the cycle. The legs 6, 7 are provided with a plurality of rope hooks 9 used to fasten the baggage. The base portion 8 is formed with an engaging portion 10 that may detachably engage a portion 19 to be engaged at the rear supporting member 5, which will be described later.

The locking bar 2 is formed of a linear hollow member with holes 11 and 12 bored at right and left ends thereof into which the right and left legs 6, 7 of the combined locking member and carrier body 1 may be inserted. The locking bar 2 is further internally provided with a locking device 3, which is operated by a key 13 so as to fixedly fasten or release the right and left legs 6, 7 to be inserted into the holes 11, 12 from the locking bar 2.

The front and rear supporting members 4, 5 are fixedly mounted on the body frame F in front of a saddle S of the autobicycle and in lateral spaced relationship. The front supporting member 4 has a base plate 14 formed at right and left hands thereof with right and left upright lugs 15, 16 integrally which have respectively supporting holes 17 bored to receive and support the locking bar 2. The rear supporting member 5 has a base plate 18 formed at an upper end thereof with a hook-like portion 19 to be engaged, with which an engaging portion 10 of the combined locking member and carrier body 1 disengageably engages.

Next, the operation of the embodiment of the present invention construction as described above will be explained. First, where the device of the present invention is used as a carrier for placing baggage or the like thereon as shown in FIGS. 1 and 2, the locking bar 2 is inserted into the supporting holes 17 in the front supporting member 4 on the body frame F. The right and left legs 6, 7 of the combined locking member and carrier body 1 are inserted into the right and left receiving holes 11, 12 of the locking bar 2 and the engaging portion 10 of the base portion 8 of the combined locking member. Next carrier body 1 is brought into engagement with the hook-like portion 19 to be engaged of the rear supporting member 5 and the locking device 3 in the locking bar 2 is locked by the key 13. The combined locking member and carrier body 1 and locking bar 2 constitute a square framework, which can be used as a carrier for placing baggage or the like thereon. It will be noted that in order to remove the carrier from the body frame F, the operation reverse to the former may be accomplished.

Figure 4:
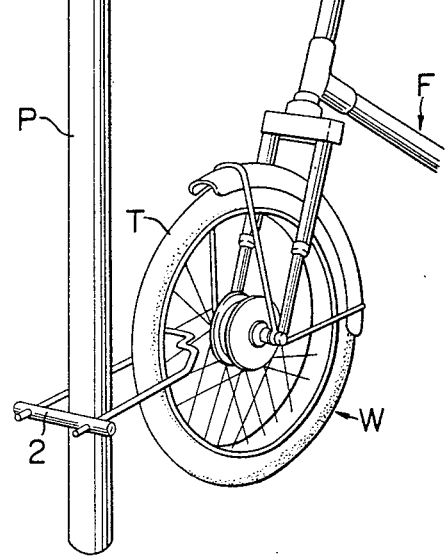
FIG. 4 is a perspective view of the device in accordance with the present invention, being used as a locking device for the cycle.

Secondly, where the device of the present invention is used as a locking device for the cycle, the wheel W of the cycle is moved close to the fixed post P to be secured onto the ground. The combined locking member and carrier body 1 and locking bar 2 are removed from the body F as previously mentioned. The combined locking member and carrier body 1 is inserted into the wheel W internally thereof so as to encircle the tire T of the wheel and the fixed post P. Right and left legs 6, 7 of the combined locking member and carrier body 1 are inserted into the locking bar 2 as shown in FIG. 4, and these elements are fixedly fastened by the locking device 3 as previously mentioned, then the wheel W is connected to the fixed post P to prevent the autobicycle from being stolen.

As described above, in the present invention, the device can be used in cycle, as a carrier for placing baggage thereon by securing the combined locking member and carrier body 1 and locking bar 2 to the frame F. When the cycle is parked, the combined locking member and carrier body may be utilized as a locking device relative to the fixed post P or the like, to prevent a theft trouble of the autobicycle.

The device of the present invention is very convenient for the driver to use and since the device can be used in either case as when the cycle is used or parked, no consideration need be made where to store it and in addition, there is no fear of losing it.

BEST MODE OF INVENTION

A combined cycle lock and carrier apparatus 1 having a frame formed in the shape of a U with two legs 6, 7 the width of which is at least larger than the width of the tire of the cycle. A locking bar 2 is disposed between two free ends of the locking member - carrier body 6, 7. A locking device 3 disposed within said bar 2 integrally fastens the bar 2 to the locking member - carrier body 6, 7. Front and rear support members 15, 18 attached to the cycle frame and affix the locking member - carrier body 1 in proper position in the frame.

Many modifications and variations of the present invention are possible in light of the above teachings. It is, therefore, to be understood that within the scope of the appended claims, the invention may be practiced otherwise than as particularly described.

What is claimed is:

1. A combined carrying and locking device for a cycle having a frame, said device comprising: a bracket means fixed to said frame, a substantially u-shaped carrier body including a pair of parallel spaced legs and a base portion interconnecting said legs; a bar removably receiving said legs, said bar being removably mounted on said bracket means; a supporting member fixed to said frame for removably engaging said base portion when said bar is mounted on said bracket means whereby said carrier body may carry an article to be transported by said cycle; and means disposed within said bar for selectively locking said legs to said bar whereby said carrier body and bar may be removed from said bracket means and used to encircle an element of said cycle in a locked condition.

2. A device as claimed in claim 1 and further including a plurality of projections extending from each of said legs.

3. A device as claimed in claim 1 wherein said bar includes apertures for removably receiving said legs.

* * * * *